(12) United States Patent
Kiefer et al.

(10) Patent No.: US 8,307,694 B1
(45) Date of Patent: Nov. 13, 2012

(54) HYPERVELOCITY IMPACT DETECTION METHOD AND SYSTEM FOR DETERMINING IMPACT LOCATION IN A DETECTION SURFACE

(75) Inventors: Karl F. Kiefer, Conroe, TX (US); Doug Heermann, Conroe, TX (US); Eric Krug, Conroe, TX (US); Guinara Ajupova, Conroe, TX (US)

(73) Assignee: Invocon, Inc., Conroe, TX (US)

( * ) Notice: Subject to any disclaimer, the term of this patent is extended or adjusted under 35 U.S.C. 154(b) by 551 days.

(21) Appl. No.: 12/614,413

(22) Filed: Nov. 7, 2009

Related U.S. Application Data

(63) Continuation-in-part of application No. 12/383,062, filed on Mar. 18, 2009.

(60) Provisional application No. 61/112,190, filed on Nov. 7, 2008, provisional application No. 61/037,704, filed on Mar. 18, 2008.

(51) Int. Cl.
*G01M 7/00* (2006.01)

(52) U.S. Cl. ....................................................... 73/12.01

(58) Field of Classification Search ....... 73/12.01–12.14
See application file for complete search history.

(56) References Cited

U.S. PATENT DOCUMENTS

| | | | | |
|---|---|---|---|---|
| 3,678,495 | A | * | 7/1972 | Gilbert ...................... 340/323 R |
| 4,055,089 | A | | 10/1977 | Shriver |
| 4,856,318 | A | * | 8/1989 | Hogan et al. .................. 73/12.13 |
| 5,280,751 | A | * | 1/1994 | Muirhead et al. ............. 102/210 |
| 5,604,431 | A | | 2/1997 | Serna |
| 5,610,363 | A | * | 3/1997 | Crews et al. .................. 89/36.02 |
| 6,628,567 | B1 | | 9/2003 | Prosser et al. |
| 7,061,251 | B2 | | 6/2006 | Taylor et al. |
| 7,189,959 | B1 | | 3/2007 | Morison et al. |
| 7,336,962 | B2 | * | 2/2008 | Levitan ...................... 455/456.1 |
| 7,643,015 | B2 | * | 1/2010 | Paradiso et al. ............... 345/177 |
| 7,916,128 | B2 | * | 3/2011 | Paradiso et al. ............... 345/177 |

* cited by examiner

*Primary Examiner* — Max Noori
(74) *Attorney, Agent, or Firm* — Kenneth A. Roddy

(57) ABSTRACT

A hypervelocity impact detection method and system for determining the precise impact location in a detection surface, of impacts such as ballistic missile intercepts, micrometeoroids and orbital debris (MMOD) or other shock events, utilizes a gridless detection surface capable of propagating radio frequency (RF) impact detection signals responsive to receiving hypervelocity impacts from objects, and multiple sensors on the detection surface that directly measure radio frequency RF emissions generated by the hypervelocity impacts on the surface, and a time of arrival (TOA) position measurement technique for determining the precise impact location in the detection surface.

11 Claims, 3 Drawing Sheets

HYPERVELOCITY IMPACT DETECTION METHOD AND SYSTEM FOR DETERMINING IMPACT LOCATION IN A DETECTION SURFACE

CROSS REFERENCE TO RELATED APPLICATION

This application claims priority of U.S. Provisional Application Ser. No. 61/112,190, filed Nov. 7, 2008, and is a Continuation-In-Part of and claims priority of Non-provisional U.S. patent application Ser. No. 12/383,062, filed Mar. 18, 2009, which claimed priority of U.S. Provisional Application Ser. No. 61/037,704, filed Mar. 18, 2008. Each of these identified prior applications is hereby incorporated by reference in its entirety.

BACKGROUND OF THE INVENTION

1. Field of the Invention

This invention relates generally to methods and systems for determining the impact point and damage propagation in a detection surface, and more particularly to a hypervelocity impact detection method and system that utilizes a gridless detection surface and multiple sensors that directly measure RF emissions generated by hypervelocity impacts and Time Of Arrival (TOA) position measurements for determining the precise impact location in the detection surface.

2. Background Art

Continuous damage detection and characterization for various structures has been an elusive goal due to the transitory nature of the detectable high-frequency signals. A variety of techniques for detecting damage exist for detecting damage on aircraft, manned spacecraft, ships and underwater vehicles, motorized vehicles, storage tanks, pressure vessels, and civil structures. These techniques generally require the use of large numbers of sensor channels to be distributed throughout the structure to be monitored. Further, these sensors must be monitored continuously for transient signals that are indicative of damage, such as cracking, delamination, and impact. However, the size, complexity, and power consumption of the necessary electronics to acquire, process, and store the resulting digital waveforms is often too large to be included in operational vehicles or structures.

Various techniques have been used to monitor vehicles and structures for impact with micrometeoroids and orbital debris (MMOD) or other shock events in the past. Many involve the high-speed data acquisition and processing of large numbers of individual sensors, which are all wired back to a central location. Although these systems may be capable of detecting impact events, the vehicle resources required for the systems, such as power, mass, and volume, have been excessive.

Most lethality assessment systems and methods for determining the impact point and damage propagation in a detection surface, such as ballistic missile intercepts, micrometeoroids and orbital debris (MMOD) or other shock events typically utilize a grid based lethality detection system in which a wire grid forms a mesh over the surface of the target missile nosecone and wire breaks within that grid are detected upon impact to provide an assessment of the impact point and subsequent damage propagation.

Frequency Domain Reflectometry (FDR) is a signal processing technique that encompasses several technical applications. The basic principle of FDR is the use of FM ranging to determine the distance to a reflective object. Examples include Frequency Modulated Continuous Wave (FMCW) RADAR and distance to fault (DTF) measurements in communications cables. DTF measurements are applicable to any cable installation that is obscured or inaccessible for manual or visual inspections or that could contain invisible faults suffered due to material aging, corrosion, or exposure. Examples of common uses are aircraft wiring harnesses and remote transceiver sites such as cellular telephone towers. Time Domain Reflectometry (TDR) is another technique used to measure cable faults. FDR is differentiated from TDR by the use of a frequency sweep as the interrogation signal rather than a high frequency impulse as used in TDR systems.

Prosser, et al, U.S. Pat. No. 6,628,567 discloses an acoustic monitoring device having at least two acoustic sensors with a triggering mechanism and a multiplexing circuit. After the occurrence of a triggering event at a sensor, the multiplexing circuit allows a recording component to record acoustic emissions at adjacent sensors. The acoustic monitoring device is attached to a solid medium to detect the occurrence of damage.

Devices for acquiring high-speed transient signals, for example acoustic emissions, typically require data acquisition electronics that are in a high-power mode for acquiring data on at least one channel at the full data acquisition rate. The power consumption of these high-speed data acquisition electronics is significantly high. To determine if the acquired data is a transitory event of interest, a digital circuit must process the acquired digital data in some way, which requires a significant amount of power and processor resources. Acquired data must be stored in digital memory temporarily while the data is processed, such that if a transient event of interest is detected, the acquired data can be obtained. Continuously storing data to memory requires a significant amount of power.

SUMMARY OF THE INVENTION

The present hypervelocity impact detection method and system overcomes the aforementioned problems and is distinguished over grid based detection systems, and acoustic detection systems, in that it utilizes a gridless "detection surface" construction rather than a wire "detection grid". The gridless detection surface is formed of a material capable of propagating radio frequency (RF) impact detection signals responsive to receiving hypervelocity impacts from objects. The present gridless detection surface may be an electronically conductive surface, at least two noncontiguous surfaces joined to allow electrical coupling between the surfaces, an inner conductor layer in which the detection signals will propagate sandwiched between two dielectric layers with conductive ground planes connected at an edge of the detection surface, or combinations thereof.

The present hypervelocity impact detection method and system utilizes multiple sensors that directly measure RF emissions generated by hypervelocity impacts on the surface and a "Time Of Arrival" (TOA) position measurement technique for determining the precise impact location in the detection surface, of impacts such as ballistic missile intercepts, micrometeoroids and orbital debris (MMOD) or other shock events. The present system and method provides significant size, cost, and performance improvements over conventional grid based systems.

DESCRIPTION OF THE PREFERRED EMBODIMENTS

Based on data released by the Air Force Research Laboratory (AFRL) from impact testing performed in hypervelocity test chambers, hypervelocity impacts have been shown to generate detectable RF emissions. We have conducted tests at the NASA hypervelocity impact facility at Las Cruces, N. Mex. which has provided data on the frequency content and magnitude of such RF pulses If these RF emissions were to be sensed from multiple geometric locations on the breached surface the precise impact location could be determined by measuring the difference in Time of Arrival (TOA) of the generated signals. The measurement of this very small difference in TOA requires precise electronic timing to detect. For example, a path difference of 1 m corresponds to only 3.33 nanoseconds. Achieving centimeter position resolution requires picosecond timing accuracy. The present hypervelocity impact detection method and system provides a processing technique and system that allows the measurement of these very small TOA differences with commercially available electronic components.

Figure 1B:
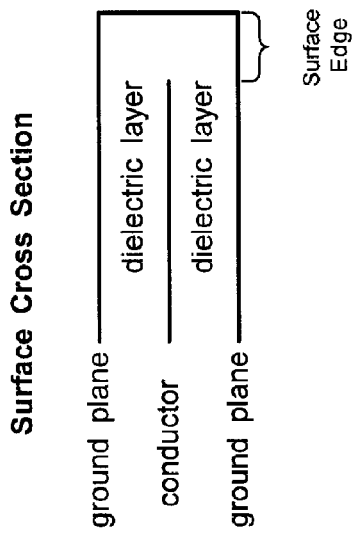
FIG. 1B is a schematic cross sectional view of an embodiment of the detection surface having an inner conductor layer in which the detection signals will propagate sandwiched between two dielectric layers with conductive ground planes connected at an edge of the detection surface.
Figure 1A:
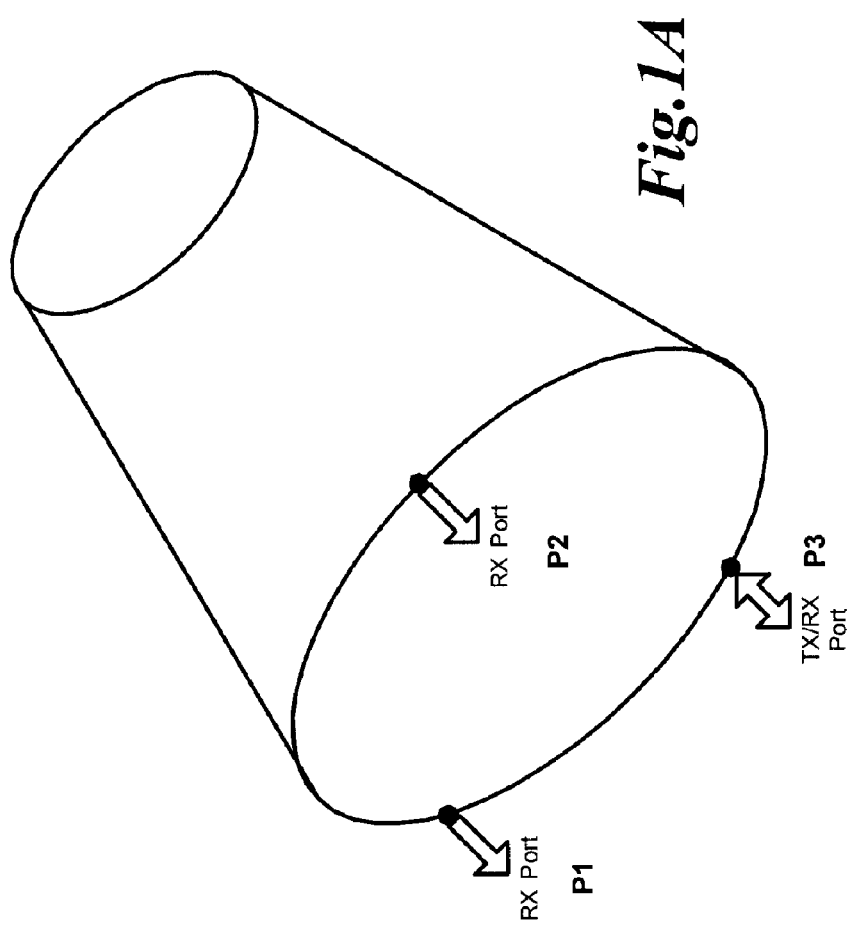
FIG. 1A illustrates, schematically, a physical configuration of an example of a gridless detection surface that may be used to implement the hypervelocity impact detection method and system of the present invention.

FIG. 1A illustrates, schematically, a physical configuration of an example of a gridless detection surface that may be used to implement the hypervelocity impact detection method and system of the present invention. At this point we will use the term "detection surface" to differentiate the present gridless type of construction from a "detection grid". Unlike a "detection grid", in which a wire grid forms a mesh over the surface and wire breaks within that grid are detected upon impact, the present gridless "detection surface" may be an electronically conductive surface, at least two noncontiguous surfaces joined to allow electrical coupling between the surfaces, an inner conductor layer sandwiched between two dielectric layers with conductive ground planes connected at an edge of said detection surface, or combinations thereof.

FIG. 1B illustrates, schematically, an embodiment of the detection surface having an inner conductor layer in which the detection signals will propagate sandwiched between two dielectric layers with conductive ground planes connected at an edge of the detection surface. This layered assembly is encompassed by conductive ground planes which are connected at the surface edge. The material selection and thickness of the dielectric layers are critical to the surface design as they contribute to the frequency selectivity as well as the propagation velocity of signals in the surface.

In a typical three-port measurement configuration, one of the ports or detection points is designated as a transmit/receive port TX/RX and the other ports are designated as receive only ports RX. In a typical system, an interrogation signal is injected into the surface at the transmit/receive port TX/RX and measurements of reflected signals are captured at all ports. In the present system, the detection surface is constructed as described above and is provided with at least two RF connectors P1 and P2 for making RF measurements of the surface.

When a hypervelocity impact takes place, the detection surface material is compressed differentially in such a way so that the inherent equalization of the compressed electron density in one area of the impact is directed to the uncompressed area of the material and thus an electrical current flows until the redistribution of the electrical charge has been completed. This rapid redistribution of charge and the inherent current that results emits a radio frequency pulse that is induced into the conductive detection surface as well as radiated into the atmosphere. These pulses are relatively high voltage (proportional to the size and velocity of the impact) and can be captured via conduction on the surface by the RF connectors P1 and P2, or radio frequency antennas within the range of the radiated signal. This pulse creation at the hypervelocity impact can be detected as it travels through the conductive surface of the detection surface material—i.e. the skin of an aircraft, missile, or spacecraft.

The detection point on the present gridless detection surface is, in effect, similar to the connection of the center conductor of a coax cable to the surface. As described hereinafter, each of the ports or detection points is coupled with a high-speed clock array. The clocks are running at the same speed and will stop (and be read out) when the pulse resulting from an impact is detected. The time of arrival (TOA) at each of the detection points is used to calculate the location of the impact.

With at least three unique pulse detection points on the surface and clocks that can measure picoseconds resolution, the relative Time Of Arrival (TOA) of the pulses at the detection points can be used to compute the location of the impact much the same way as LORAN is used to compute the location of aircraft.

Figure 2:
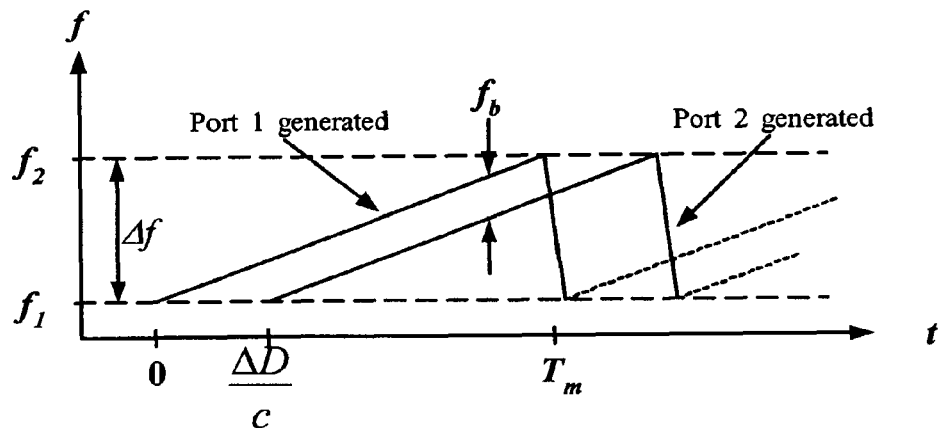
FIG. 2 is a graph illustrating a relatively low frequency oscillation (beat frequency) generated by two high frequency voltage controlled oscillators (VCO's) that has a proportional relationship to the phase difference of the control voltage of the two VCO's, and the mathematical relationship developed that provides a basis that is expanded upon to apply the Time Of Arrival (TOA) measurement technique to the hypervelocity impact detection assessment in accordance with the present invention.

Referring now to FIG. 2, there is shown a graph illustrating a relatively low frequency oscillation (beat frequency) generated by two high frequency voltage controlled oscillators (VCO's) that has a proportional relationship to the phase difference of the control voltage of the two VCO's, and provides the mathematical basis that is expanded upon to apply the Time Of Arrival (TOA) measurement technique. Triggering the starting phase of the control voltages with received pulses generated by a hypervelocity impact produces a beat frequency that is straightforward to measure with commercially available electronics. Analog electronic sensors detect the generated pulse and trigger a ramp function used to modulate a RF voltage controlled oscillator (VCO). Mixing the oscillator outputs from different receive ports generates a beat frequency that is directly proportional to the Time of Arrival (TOA) difference between the ports. The frequency oscillation (beat frequency) is measured by sampling the mixer output and performing a fast Fourier transform (FFT) or using a frequency counter.

A constant beat frequency is achieved due to the nature of the constructed VCO signals. A plot of the port 1 frequency vs. time is a linear sweep in frequency from f1 to f2 ($\Delta$f) that occurs over the time period $T_m$ (modulation period). The port 2 signal is exactly the same as the port 1 signal but delayed by ΔD/c where ΔD is the difference in distance between the impact point and the receive ports, and c is the speed of light in the medium which the signals propagate.

The relationship of the resultant beat frequency to the distance of the detected object is defined by the equation:

$$f_b = \text{beat frequency} = \frac{\Delta D}{c} \frac{\Delta f}{T_m}$$

As described above, the measurement of the resultant beat frequency provides indirect measurement of the difference in distance between the impact point and the receive ports. The mathematical relationship developed here then provides a basis that is expanded upon to apply the Time of Arrival (TOA) measurement technique to lethality assessment.

Figure 3:
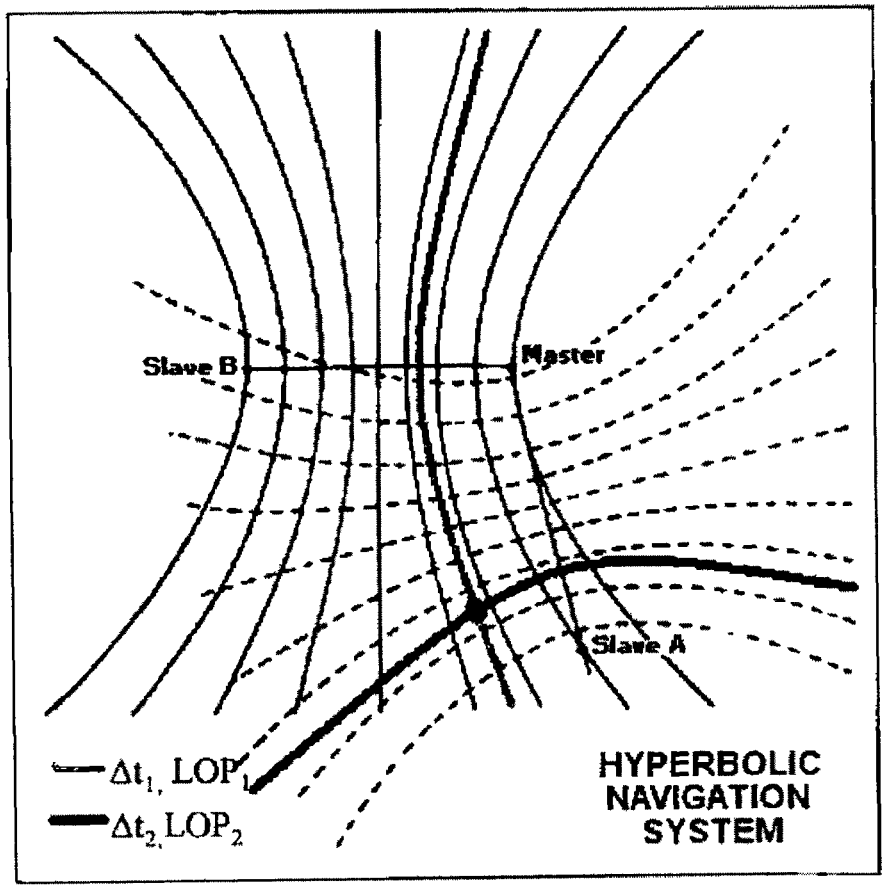
FIG. 3 is a diagram depicting how impact site location is determined using a hyperbolic navigation approach and navigation receivers which is the basis for the Time Of Arrival (TOA) measurement technique that precisely identify the location of the impact.

FIG. 3 is a diagram depicting how impact site location is determined using a hyperbolic navigation approach and navigation receivers, similar to LORAN. LORAN determines its 2-dimensional location based on measuring the time of arrival (TOA) of signals from three transmitting sources. The present hypervelocity impact detection method and system uses a process similar to the LORAN process but with a single transmitter (the hypervelocity impact event) and multiple pulse detection points placed around the impact surface. The time of arrival (TOA) differential between any two sources will result in a hyperbolic curve called a "line of position" (LOP). The receiver location can be accurately determined by the intersection of two or more of the LOP's. Time delay between two receivers $\Delta t_1$ determines a line of possible positions ($LOP_1$). Time delay between another pair of receivers $\Delta t_2$ fixes the site location as an intersection of $LOP_1$ with another hyperbolic line of possible positions ($LOP_2$). Thus, the time of arrival (TOA) measurements made between the detection points will result in intersecting LOP's that uniquely identify the position of the impact.

Figure 4:
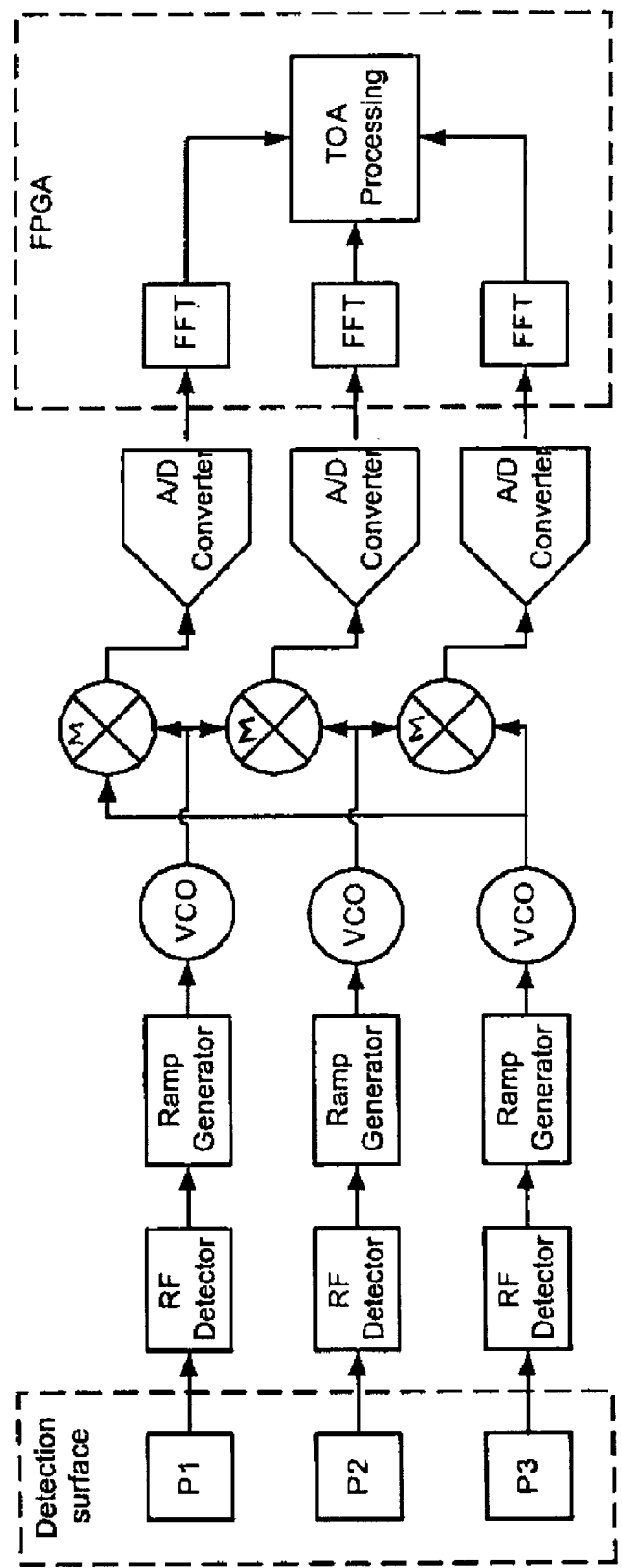
FIG. 4 is a functional block diagram of the electronic circuitry and components for a three-port Time Of Arrival (TOA) system.

FIG. 4 is a functional block diagram for a three-port Time Of Arrival (TOA) system. It should be understood that this diagram can easily be expanded to increase the number of detection ports by replication of the receive channel circuitry. The main electronics sections of this system are described below.

Analog Electronics

The analog electronics include RF detectors, ramp generators, voltage controlled oscillators (VCO's), received signal mixers M, and analog to digital A/D converters, and perform the following functions. The RF Detectors detect the RF signal generated by the impact event and produces an output pulse capable of triggering the ramp generator circuit. The ramp generator circuits, upon receiving an input trigger from the RF detectors produce a ramping control voltage that drives the voltage controlled oscillators (VCO's). The voltage controlled oscillators (VCO's) provide linear frequency swept signals that will be mixed to produce beat frequencies for Time of Arrival (TOA) detection. Signals received from the ports P1, P2, and P3 on the detection surface are mixed by the received signal mixer circuits M to generate beat frequencies or impact pulses when impacts occur on the detection surface. The analog to digital A/D converters sample the mixer outputs to allow the frequency domain signal processing to occur digitally.

Time of Arrival (TOA) Processing

The Time Of Arrival (TOA) processing is a completely digital operation in which the frequency response of all ports are measured by Fourier analysis (FFT) or high-speed digital frequency counters and threshold detectors to detect beat frequencies or primary pulse arrival that occur as a result of impacts on the surface. Both the discrete Fournier transform (DTF) processing and direct measurement of time of arrival (TOA) are implemented in high speed programmable logic devices such as Field Programmable Gate Arrays (FPGA).

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A system for determining the impact point of a hypervelocity impact and damage propagation in a detection surface utilizing radio frequency (RF) emissions generated by the hypervelocity impact, comprising:
    a gridless detection surface comprising an electronically conductive material operative to emit and propagate electromagnetic radio frequency (RF) impact detection signals responsive to receiving hypervelocity impacts from objects;
    a plurality of radio frequency (RF) detectors coupled with said detection surface that directly measure RF emissions generated by the hypervelocity impacts; and
    time of arrival (TOA) position measurement means coupled with said detectors for determining the impact location in said detection surface.

2. The system according to claim 1, wherein
said gridless detection surface is formed of at least one layer of material capable of being compressed differentially upon impact such that equalization of compressed electron density in one area of the impact is directed to an uncompressed area of the material and an electrical current flows until redistribution of the electrical charge has been completed such that redistribution of the electrical charge and current that results therefrom emits a radio frequency pulse that is induced into said detection surface.

3. The system according to claim 1, wherein
said gridless detection surface is selected from the group consisting of an electronically conductive surface, at least two noncontiguous surfaces joined to allow electrical coupling between the surfaces, an inner conductor layer sandwiched between two dielectric layers with conductive ground planes connected at an edge of said detection surface, and combinations thereof.

4. The system according to claim 1, wherein
said detection surface is an assembly of an inner conductor layer sandwiched between two dielectric layers with conductive ground planes connected at an edge of said detection surface, wherein radio frequency (RF) impact detection signals are propagated in said inner conductor layer responsive to said detection surface receiving a hypervelocity impact from an object.

5. The system according to claim 4, wherein
said dielectric layers of said detection surface are formed of a material capable of being compressed differentially upon impact such that equalization of compressed electron density in one area of the impact is directed to an uncompressed area of the material and an electrical current flows until redistribution of the electrical charge has been completed such that redistribution of the electrical charge and current that results therefrom emits a radio frequency pulse that is induced into said detection surface.

6. The system according to claim 1, wherein
said plurality of radio frequency (RF) detectors coupled with said detection surface comprise at least one signal transmit/receive port and at least two signal receive-only ports on said detection surface spaced a distance therefrom, said signal transmit/receive port injecting an interrogation signal into said detection surface and reflected signals of the interrogation signal being received by said signal transmit/receive port and said signal receive-only ports.

7. A system for determining the impact point of a hypervelocity impact and damage propagation in a detection surface utilizing radio frequency (RF) emissions generated by the hypervelocity impact, comprising:
a gridless detection surface comprising an electronically conductive material operative to emit and propagate electromagnetic radio frequency (RF) impact detection signals responsive to receiving hypervelocity impacts from objects;
a plurality of radio frequency (RF) detectors coupled with said detection surface that directly measure RF emissions generated by the hypervelocity impacts; and
said radio frequency (RF) detectors including at least one signal transmit/receive port and at least two signal receive-only ports on said detection surface spaced a distance therefrom, said signal transmit/receive port injecting an interrogation signal into said detection surface and reflected signals of the interrogation signal being received by said signal transmit/receive port and said signal receive-only ports; and
time of arrival (TOA) position measurement means coupled with said detectors for determining the impact location in said detection surface, comprising:
a ramp generator circuit coupled with said radio frequency (RF) detectors for producing a ramping control voltage responsive to receiving an input trigger signal from said RF detectors, said radio frequency detectors producing said input trigger signal upon detecting a radio frequency (RF) signal generated by the impact event;
a voltage controlled oscillator circuit (VCO) coupled with said ramp generator circuit and driven by the ramping control voltage to produce frequency swept interrogation signals;
signal mixer means connected with said voltage controlled oscillator circuit (VCO) and with each said signal transmit/receive port and signal receive-only port for mixing signals received from said ports on the detection surface with the linear frequency swept signals to generate beat frequencies when impacts occur on the detection surface;
analog to digital converters coupled with said signal mixer means for sampling the output of said signal mixer means to allow frequency domain signal processing to occur digitally;
high-speed programmable distance to fault digital processor means for measuring and analyzing the frequency response of all said ports to detect beat frequencies or primary pulse arrival that occur as a result of impacts in said detection surface and compare the frequency measurements to the baseline beat frequency to detect the existence of newly measured impacts, compute distance vectors to those impacts from the individual ports, and encode the data representing the distance vectors to the impacts; and
high-speed digital counters and threshold detectors for measuring of the time difference between the arrival of the hypervelocity impact pulse at each sensor location on the detection surface.

8. The system according to claim 7, wherein
said frequency swept interrogation signals output by said voltage controlled oscillator circuit is injected into said detection surface at said signal transmit/receive port and is also used as a reference signal wherein the time delay in a resultant received reflected signal is proportional to the range that the signal has traveled through said detection surface and said generated baseline beat frequency is proportional to the magnitude of the range.

9. A method for determining a precise impact location in a detection surface of hypervelocity impacts such as ballistic missile intercepts, micrometeoroids and orbital debris (MMOD) or other shock events, comprising the steps of:
providing a gridless detection surface comprised of a material capable of propagating radio frequency (RF) impact detection signals responsive to receiving hypervelocity impacts from objects, a plurality of radio frequency (RF) detectors coupled with said detection surface that directly measure RF emissions generated by the hypervelocity impacts, and time of arrival (TOA) position measurement means coupled with said detectors for determining the impact location in said detection surface;
generating a relatively low frequency oscillation baseline constant beat frequency utilizing two high frequency voltage controlled oscillators (VCO's) that has a proportional relationship to the phase difference of the control voltage of the two oscillators;
triggering a starting phase of the control voltage with received radio frequency (RF) pulses generated by a hypervelocity impact; and
electronically detecting the radio frequency (RF) pulses generated by a hypervelocity impact and triggering a ramp function to modulate the voltage controlled oscillators, mixing the oscillator outputs from different radio frequency (RF) detectors to generate a beat frequency that is directly proportional to the time of arrival (TOA) difference between the radio frequency (RF) detectors; wherein
the measurement of the resultant beat frequency provides indirect measurement of the difference in distance between the impact point and the radio frequency (RF) detectors.

10. The method according to claim 9, wherein
said baseline constant beat frequency of the voltage controlled oscillators (VCO's) is a frequency vs. time linear sweep, and the relationship of the resultant beat frequency to the distance of the detected impact is determined by the equation:

$$f_b = \text{beat frequency} = \frac{\Delta D}{c} \frac{\Delta f}{T_m}$$

where the constant beat frequency of the voltage controlled oscillators is in a frequency from f1 to f2 ($\Delta f$) that occurs over the modulated time period Tm, and the frequency of the radio frequency (RF) pulses generated by a hypervelocity impact is delayed by $\Delta D/c$ where $\Delta D$ is the difference in distance between the impact point and the radio frequency (RF) detectors, and c is the speed of light in the medium in which the signals propagate.

11. The method according to claim 9, wherein said mixed oscillator outputs from different radio frequency (RF) detectors are converted to digital signals and processed by digital processor means utilizing Fourier analysis implemented in high speed programmable logic devices to measure and analyze the frequency response of said radio frequency (RF) detectors and compare the frequency measurements to the baseline beat frequency to detect the existence of newly measured impacts, compute distance vectors to those impacts from the individual ports, and encode the data representing the distance vectors to the impacts.

* * * * *